F. A. HILL.
SULKY-PLOW.
No. 191,342. Patented May 29, 1877.
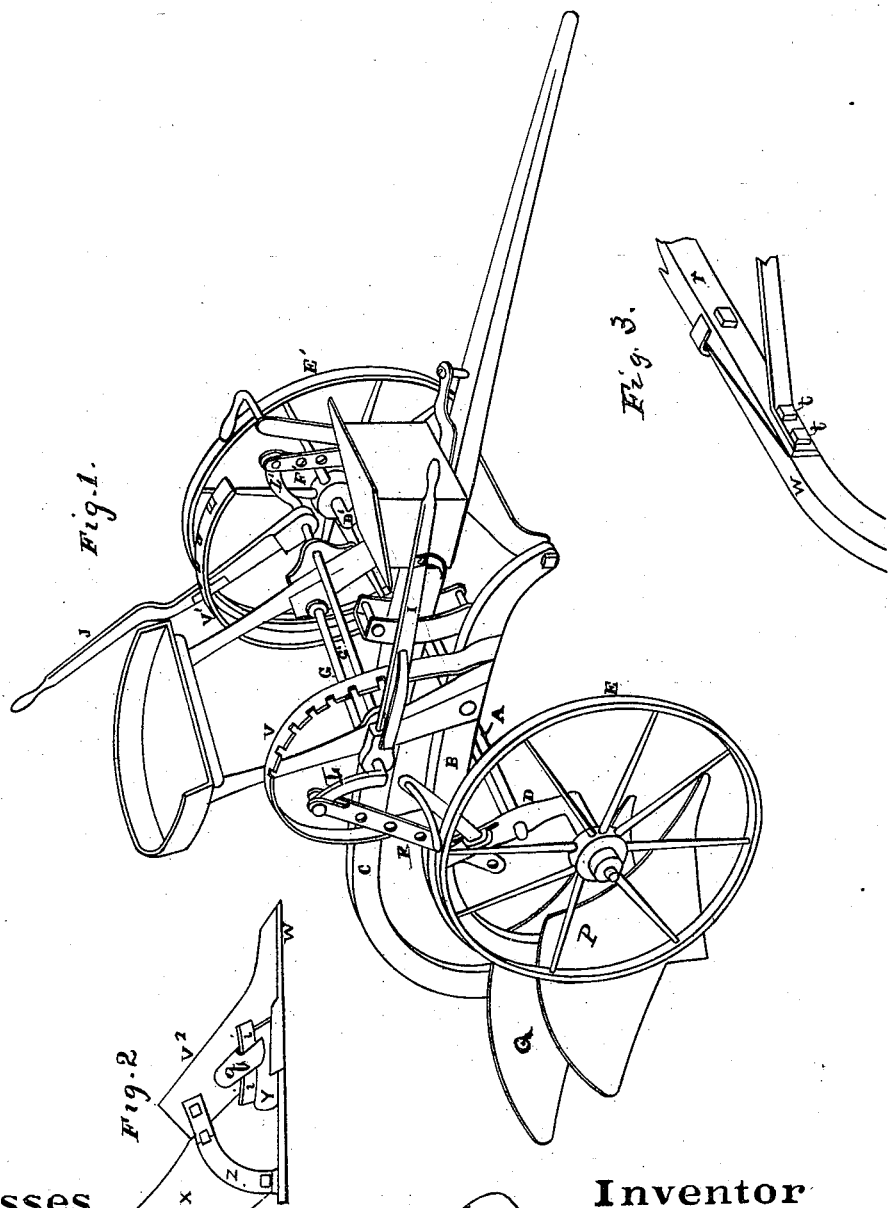
Witnesses
Geo. H. Strong
Jno. L. Boone
Inventor
Frank A. Hill
by Dewey & Co.
Attys.

UNITED STATES PATENT OFFICE.

FRANK A. HILL, OF SAN LEANDRO, CALIFORNIA.

IMPROVEMENT IN SULKY-PLOWS.

Specification forming part of Letters Patent No. 191,342, dated May 29, 1877; application filed March 1, 1877.

*To all whom it may concern:*

Be it known that I, FRANK A. HILL, of San Leandro, county of Alameda, and State of California, have invented Improvements in Sulky-Plows; and I do hereby declare the following to be a full, clear, and exact description thereof, reference being had to the accompanying drawings.

My invention consists in mounting the crank-axles upon which the bearing-wheels of the plow are mounted in reverse positions, so as to throw one of the wheels in advance of the other, for convenience in turning the plow at the end of the furrow. This arrangement also provides a more convenient disposition of the levers by which the crank-axles are adjusted. I also provide a novel arrangement for attaching the rear plow to the plow-beam, where two plows are to be used, and detaching it therefrom when it is desired to use it as a single plow.

Referring to the accompanying drawing, Figure 1 is a perspective view of my plow. Fig. 2 is a bottom view of the plowshare. Fig. 3 is a detail view of the beam-connection.

A is the connecting-bar, upon which the plow-beams B C are secured. To each end of this connecting-bar I attach a crank-axle, D, and upon these crank-axles I mount the bearing-wheels E E'.

I prefer to employ the particular style of crank-axle which is represented in Letters Patent granted to me on the 7th day of September, 1869, because it allows me to make the proper lever-connections in a simple and convenient manner.

These cranks I apply reversely upon the opposite ends of the bar A, as represented— that is, the crank on the left-hand side is directed toward the rear of the plow, while the crank on the right-hand side is directed toward the forward end of the plow. This throws the left-hand wheel in rear of the opposite one, so that it will serve as a pivot for the plow to turn on at the end of the furrow, so that a shorter turn can be made without backing the pivot-wheel. F F' are the adjustable extension-arms of these cranks, as represented and claimed in my former patent above referred to, and G G' are the supplemental shafts, which are supported horizontally in boxes on the standards of the seat-frame, and to which the operating-levers I and J are, respectively, attached. One of these shafts is connected with the crank-axle on the right and the other is connected with the crank-axle on the left hand side of the plow, as follows: The rear end of the forward crank-axle is connected, by the extension-arm F and elbow-crank L, with the rear supplemental shaft G. The lever I, which is attached to this shaft, must be moved toward the front of the plow, in order to lower the crank-axle and elevate the plow-frame, so as to lift the plows out of the ground. The opposite or left-hand end of the forward shaft G' is connected, by the elbow-crank L' and extension-arm F', with the forward end of the crank-axle, on the left-hand side of the plow. The lever J, which operates this shaft and crank, must be moved backward or in a reverse direction from the motion of the lever I, in order to raise the plow-frame and plows. V V¹ are racks, secured on each side of the plow-frame, to suit each of the levers.

This arrangement is extremely convenient for the driver, because he can manage the plows when he is sitting on the seat by operating the right-hand lever so as to raise them out of or lower them into the ground, and as this lever operates, by moving forward, he can use his foot to depress it to the desired point. On the other hand, should he desire to walk and drive, as is often the case, he would naturally walk on the left-hand side of the plow, and, instead of climbing upon the seat when he desired to raise the plows, he can step up beside the near wheel, grasp the lever J, and draw upon it against the pull of the team, thus lowering the lever and raising the plow-frame, and lifting the plows out of the ground without trouble.

This feature in a sulky-plow is very important, as many plowmen object to this class of plows because they are compelled, if they desire to walk and drive, to be continually climbing up and down from the plow. The right-hand plow P I attach permanently to the plow-frame, but the beam of the left-hand plow Q I make in two parts. One part, r, is attached permanently upon the cross-bar A and extends a short distance in rear of it; the rear end of this permanent part of the beam I bevel, as represented. The forward end of the portion W of the plow-beam, which is attached to the plow, is also cut beveling in an opposite direction, so that when the two beveled ends are placed together they form a scarf-joint, which I secure by means of bolts $t\,t$ or other suitable fastening. When, therefore, it is desired to remove the rear plow and use the sulky as a single plow I simply detach the fastening which binds this scarf-joint together and remove the plow.

The plows P Q I provide with detachable shares in the following manner: The share $V^2$ and point W I make in one piece, but I attach the land-side to the mold-board X. To the under side of the mold-board I secure a block, Y, close to the angle between it and the land-side, and this block extends below the lower edge of the mold-board. The brace Z, which connects the rear end of the land-side with the mold-board, has the end which is fastened to the mold-board extended, so that it also projects below the lower edge of the mold-board. A projection, $q$, is formed on the rear side of the share $V^2$, a portion of which is grooved, as represented. When the share has been fitted against the block Y and projection Z a bolt is passed through the projection Z and share to secure its rear end to the mold-board, and a key or wedge, $i$, is driven between the grooved portion of the projection $q$ and the block Y, as represented, thus firmly fastening the share to the mold-board. When it is desired to detach the share, in order to sharpen it, it is only necessary to drive out the key and remove the bolt that fastens the rear end of the share to the brace Z, when the share can be removed.

I thus provide important and useful improvements in sulky-plows, which will render them much more convenient and easily operated.

Having thus described my invention, what I claim, and desire to secure by Letters Patent, is—

1. The combination, in a wheel-plow, of the wheels E E', oppositely-inclined crank-axles D D', extension-arms F F', supplement-shafts G G', reversely-operated levers I J, and racks V V$^1$, the several parts constructed and arranged to operate in the manner substantially as herein shown and described.

2. In combination with the beam B, diagonal brace $b$, and axle A, of the sectional beam C, having both parts secured by the bolts of the brace $b$, adapting the frame to the use of one or two plows, substantially as herein shown and described.

3. The mold-board X and land-side, formed in one piece, and provided with the block Y and extended brace Z, in combination with the share $V^2$, with its grooved projection $q$, the two parts being secured by a bolt and key or wedge, $i$, substantially as and for the purpose described.

In witness whereof I have hereunto set my hand and seal.

FRANK A. HILL. [L. S.]

Witnesses:
J. L. BOONE,
FRANK A. BROOKS.